US007296935B1

(12) United States Patent
Childers et al.

(10) Patent No.: US 7,296,935 B1
(45) Date of Patent: Nov. 20, 2007

(54) FERRULE ADAPTER AND FERRULE ADAPTER ASSEMBLY

(75) Inventors: Darrell R Childers, Hickory, NC (US); Russell J. Granger, Hickory, NC (US); Joseph P Howard, Hickory, NC (US); Myron W Yount, Conover, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 11/673,152

(22) Filed: Feb. 9, 2007

(51) Int. Cl.
*G02B 6/38* (2006.01)

(52) U.S. Cl. ............................ 385/55; 385/59; 385/60; 385/78

(58) Field of Classification Search .................. 385/55, 385/59, 60, 72, 78, 81
See application file for complete search history.

(56) References Cited

U.S. PATENT DOCUMENTS 7,048,447 B1 * 5/2006 Patel et al. ................... 385/59

* cited by examiner

*Primary Examiner*—Hemang Sanghavi
(74) *Attorney, Agent, or Firm*—Michael L. Leetzow, P.A.

(57) ABSTRACT

An adapter for holding a multi-fiber ferrule in position to mate with a fiber optic connector includes an adapter body having a first side and a second side, with a first opening disposed in the first side that is configured to receive the multi-fiber ferrule. A second opening is disposed in the second side of the adapter end is configured to receive a fiber optic connector. An engagement member, which preferably rotates about an axis transverse to the opening, is disposed adjacent the first opening to engage and hold the multi-fiber ferrule in the adapter.

20 Claims, 7 Drawing Sheets

48 50 10 60 18 22 14 20 80 58 34 82 12 82 24 80 56 46 82 54 80 16 32 26 30 28

FERRULE ADAPTER AND FERRULE ADAPTER ASSEMBLY

BACKGROUND OF THE INVENTION

The present invention relates generally to an adapter for mechanically and optically connecting a fiber optic connector and ferrule, and particularly to an adapter for mating an MT ferrule with an MTP connector in a box or panel.

TECHNICAL BACKGROUND

Fiber optic ribbons are widely used today to transmit a large amount of data rapidly and efficiently. Systems using fiber-optic ribbons typically have multiple connection points, or interfaces, where the light signals must be transmitted from one set of optical fibers to another set of optical fibers. These connection points or interfaces usually involve two optical ferrules that are mechanically and optically aligned to allow the light to traverse the connection points. This is achieved by either spring clipping together the optical ferrules or incorporating them into push-pull connectors and mating connectors in an adapter.

The use of push-pull connectors may significantly increase the cost of the system. There are two reasons that the connectors increase the cost: the out-of-pocket expenses for the connectors and the time required to assemble the connectors. Additionally, one of the connectors is usually disposed behind a fiber-optic panel or enclosed in a box and is never removed or accessed after the initial installation. Thus, the use of a push-pull connector in these situations causes unwarranted expense and time. However, adapters that are currently available allow for only connector to connector mating or ferrule to ferrule mating.

It would be desirable therefore to provide an adapter that is easily installed, reliable, allows for faster connection of the system, and is more cost-effective by allowing a connector to ferrule configuration.

SUMMARY OF THE INVENTION

Disclosed herein is adapter for holding a multi-fiber ferrule in position to mate with a fiber optic connector that includes an adapter body, the adapter body having a first side and a second side, a first opening disposed in the first side of the adapter body and configured to receive the multi-fiber ferrule, a second opening being disposed in the second side of the adapter body and in communication with the first opening, the second opening configured to removably receive the fiber optic connector and the first and second openings configured to position the fiber optic connector and multi-fiber ferrule to optically and mechanically engage one another, and an engagement member connected to the adapter and disposed adjacent the first opening to engage and hold the multi-fiber ferrule in the adapter.

In some embodiments, the engagement member rotates between a first position and a second position in about an axis traverse to the openings.

In some embodiments, the adapter includes a flange disposed between the two sides and is configured to engage a fiber optic panel when the adapter is inserted through a hole in the fiber-optic panel.

In some embodiments, the adapter body has two body halves, a first body half corresponding to the first side of the adapter body and a second body half corresponding to the second side of the adapter body.

In another aspect, an adapter for removably receiving one optical fiber connector and a multi-fiber ferrule in an operative coupled relationship is disclosed, the adapter includes a first body half having a free end to removably receive the optical fiber connector and a mating end opposite thereto and defining an opening therethrough from the free end to the mating end, a second body half having a free end to receive the multi-fiber ferrule and a mating end opposite thereto, the first body half having an opening therethrough from the free end to the mating end and joined to the second body half at the mating ends so as to align the openings along a common longitudinal axis, and an engagement member connected to the second body half, the engagement member disposed adjacent the free end and the opening therein to engage and hold the multi-fiber ferrule in the adapter.

In yet another aspect, an adapter and fiber optic assembly is disclosed that includes an optical fiber connector, the optical fiber connector having a ferrule that contains at least one optical fiber that terminates at an end face of the ferrule, a multi-fiber ferrule, the multi-fiber ferrule having at least one optical fiber that terminates at an end face of the multi-fiber ferrule, an adapter body, the adapter body having a first side and a second side, a first opening disposed in the first side of the adapter body and configured to receive the multi-fiber ferrule, a second opening being disposed in the second side of the adapter body and in communication with the first opening, the second opening configured to removably receive the fiber optic connector and the first and second openings configured to position the fiber optic connector and multi-fiber ferrule to optically and mechanically engage one another, and an engagement member connected to the adapter and disposed adjacent the first opening to engage and hold the multi-fiber ferrule in the adapter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
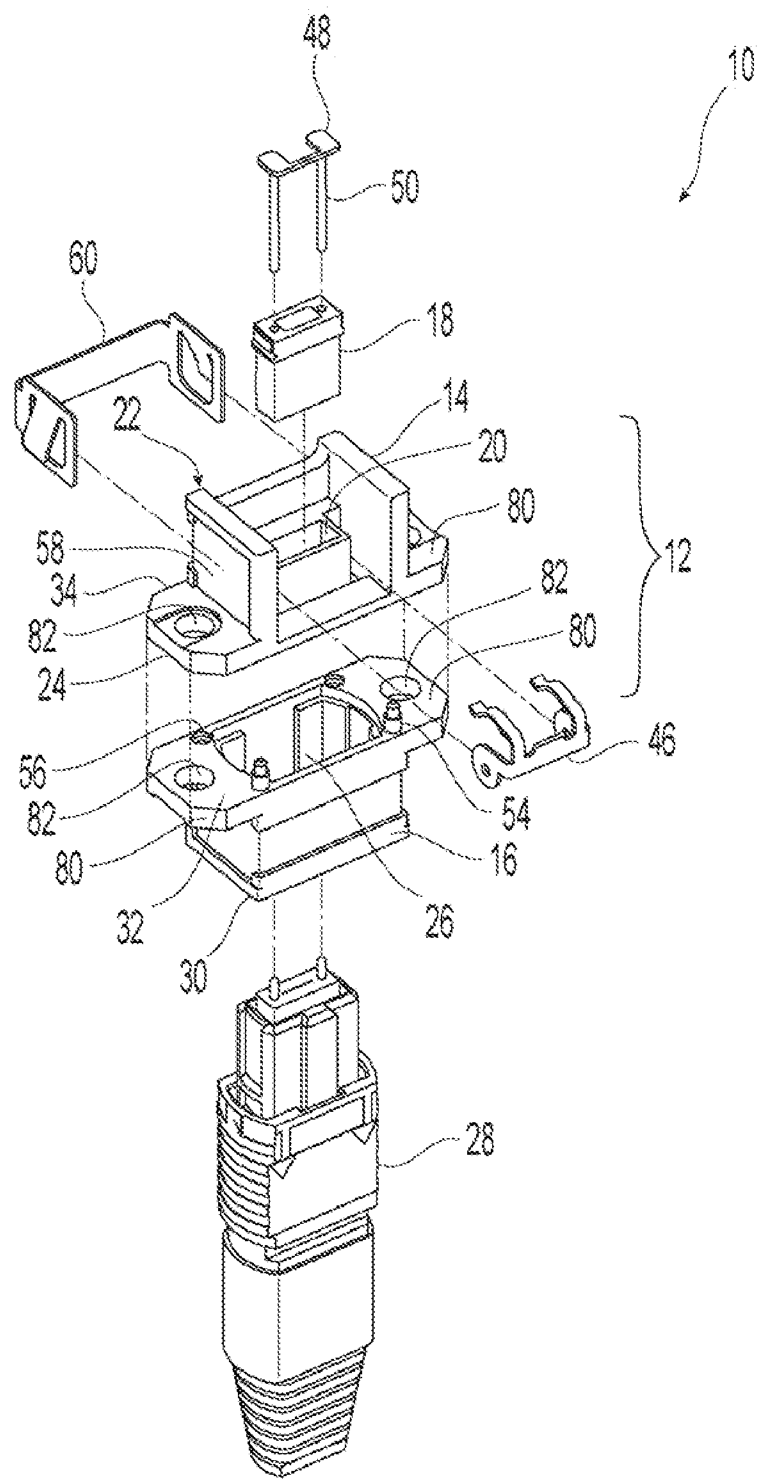
FIG. 1 is an exploded perspective view of an adapter according to the present invention with a multi-fiber connector and multi-fiber ferrule shown therewith.
Figure 2:
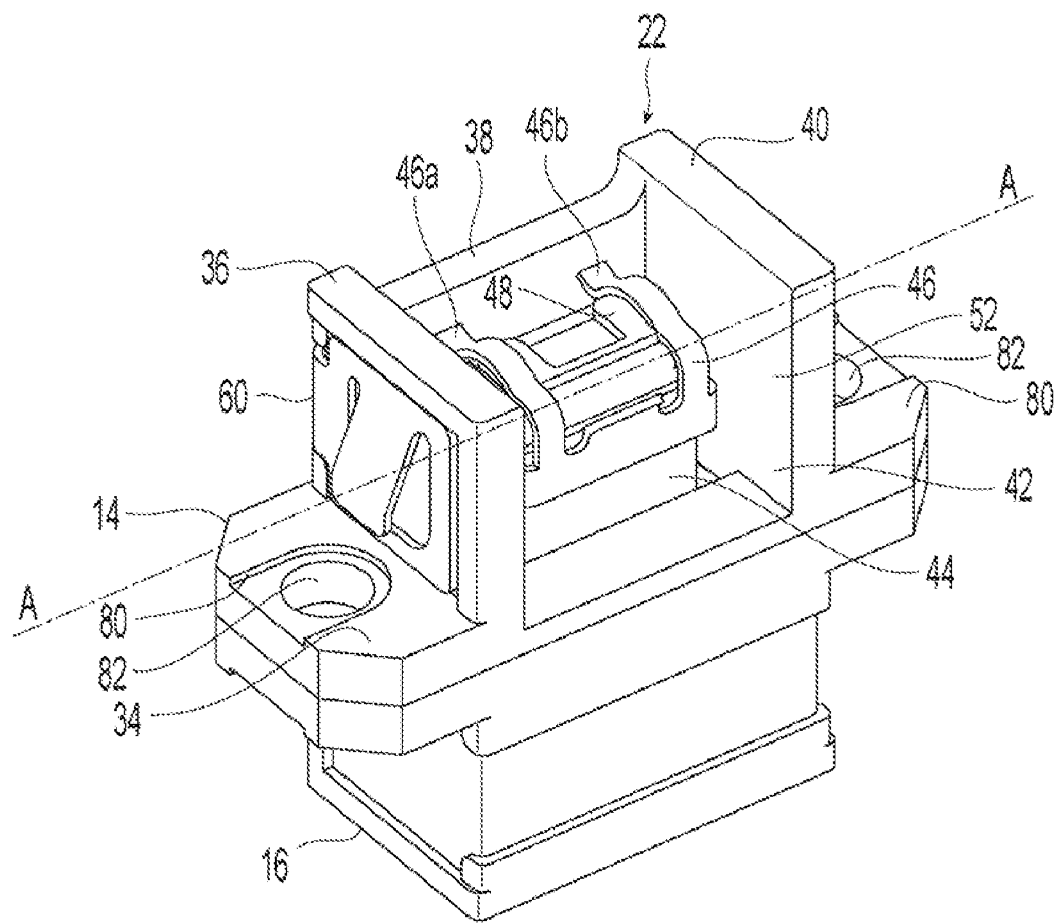
FIG. 2 is a perspective view of the assembled adapter with the multi-fiber ferrule in the adapter.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, adapter 10 has an adapter body 12 having two sides, which are illustrated as two body halves 14,16. The first body half 14 is configured to receive the multi-fiber ferrule 18 in an opening 20 that extends between a free end 22 and the mating end 24. The second body half 16 also has an opening 26 is configured to receive a fiber optic connector 28, preferably an MTP connector, but any fiber optic connector that will mate with the multi-fiber ferrule 18 is within the scope of the present invention. The second body half 16 also has a free end 30, into which the multi-fiber connector 28 is inserted, and a mating end 32. The openings 20,26 are aligned with one another such that the end face of the multi-fiber ferrule 18 and the end face of ferrule in the fiber optic connector 28 will be in mechanical and optical alignment with each other. While the adapter body 12 is illustrated as having two halves 14,16, it may be made as a single, unitary piece.

Figure 3:
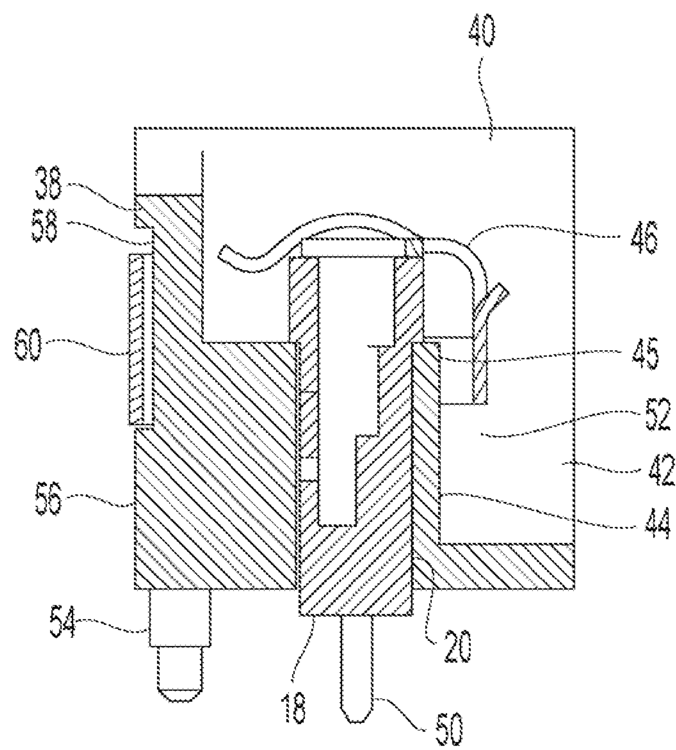
FIG. 3 is a partial cross section view of the adapter with the engagement member in a first position.
Figure 4:
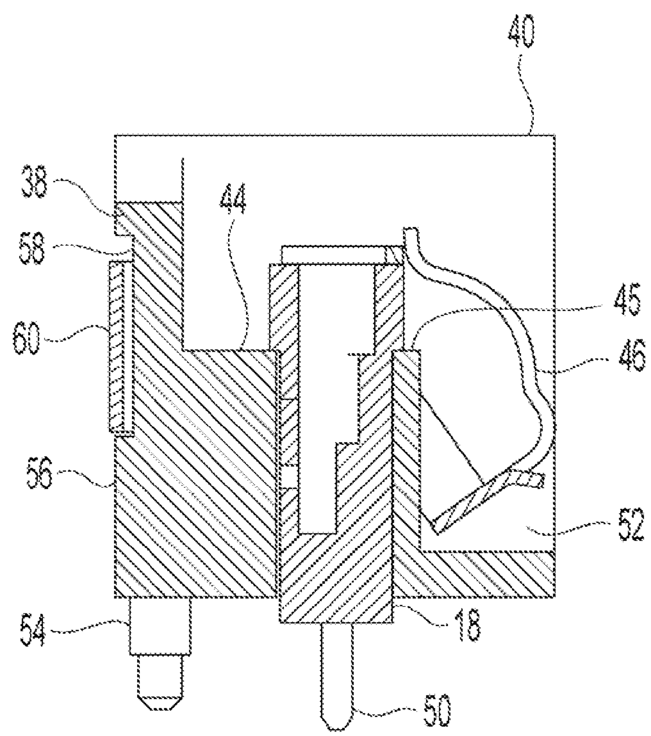
FIG. 4 is a partial cross-section view of the adapter with the engagement member rotated to a second position.

The first body half 14 has a base 34 at the mating end 24 and three walls 36,38,40 extending away from the mating end 24 and towards the free end 22 to provide protection to the multi-fiber ferrule 18 when inserted into the opening 20. The first body half 14 also has an open side 42 that allows easy access to the multi-fiber ferrule 18 and opening 20. The first body half 14 also has central pedestal 44 in which the opening 20 is formed. The central pedestal 44 is preferably attached to wall 38, but not attached to walls 36,40 to allow for connection and rotation of engagement member 46. As best seen in FIGS. 3 and 4, the engagement member 46 is rotatably attached to the central pedestal 44 and rotates about an axis A that is transverse to the longitudinal axis through the opening 20. The engagement member 46 is illustrated in FIGS. 1-4 as a rotating latch with two prongs 46*a*,46*b* that engage opposite sides of the rear face of the multi-fiber ferrule 18 in a first position (FIG. 3), but are also flexible enough to allow for the use of a pin clamp plate 48 with the multi-fiber ferrule 18 if the multi-fiber ferrule 18 is required to have guide pins 50 inserted therein. An open area 52 around the central pedestal 44 allows the engagement member 46 to rotate from the first position, engaging the multi-fiber ferrule 18 (see FIG. 3), to a second position where the multi-fiber ferrule 18 can be removed from the adapter 10 (see FIG. 4).

As illustrated in FIGS. 3 and 4, opening 20 is disposed in pedestal 44, which has an upper surface 45 that is dimensioned to engage the shoulder portion of multi-fiber ferrule 18. The opening 20 is preferably slightly larger than the front portion of multi-fiber ferrule 18, which allows some lateral movement of multi-fiber ferrule 18 within opening 20. However, the opening 20 is not so large as to allow significant movement of the multi-fiber ferrule 18 in the opening 20. In fact, the opening 20 is dimensioned such that the multi-fiber ferrule 18 will engage the guide pins 50 on the multi-fiber connector 28 (or the guide pins 50 will engage the multi-fiber connector 28) without any further alignment. The dimensioning of the opening 20 also reduces the amount to dirt and unwanted particles that can become lodged therein and affect the mechanical and optical engagement of the multi-fiber connector 28 and the multi-fiber ferrule 18. In the unmated configuration, the multi-fiber ferrule 18 only engages the upper surface 45 of pedestal 44.

Optical fibers are not illustrated as being in secured in the multi-fiber ferrule 18, but one of ordinary skill in the art would be able to properly secure and protect optical fibers in the multi-fiber ferrule 18.

The mating ends 24,32 of the two body halves 14,16 are preferably flat so that they may be attached to one another to make up the adapter body 12. However, the mating ends 24,32 may also have projections 54 and recesses 56 (corresponding to and accepting the respective projections 54 on the mating body half) to provide more strength to the adapter 10 when the two body halves 14,16 are joined together. The two body halves 14,16 may be joined in any appropriate manner, including with adhesives, by ultrasonic welding, etc.

The outer surface of walls 36,38,40 on body half 14 preferably has a recessed portion 58 to accept and maintain a spring clip 60. Spring clip 60 is used to engage a fiber-optic panel or box into which the adapter 10 is installed. The spring clip 60 is well-known in the art and may be of any appropriate size, configuration and type.

The second body half 16 is configured as a standard connector adapter half, and, in particular is illustrated as an adapter half that will accept an MTP® connector 28, available from the assignee of the present application, U.S. Conec Ltd. As noted above, the connector 28 can be of any form factor or configuration and still be within the scope of the present invention.

Both body halves 14,16 also preferably have flanges 80 adjacent the base 34 that extend outward away from openings 20, 26 to engage a fiber-optic panel or box into which the adapter 10 is installed and prevent the adapter 10 from being pulled through the opening in the fiber-optic panel or box. Additionally, flanges 80 preferably have at least one screw-sized hole 82 therein that correspond to an appropriate opening or hole in the fiber-optic panel or box, allowing the adapter 10 to be secured to the fiber-optic panel or box with a screw, bolt, rivet, or other appropriate securing member. While the flanges 80 are illustrated on both body halves 14,16, either body half may or may not have the flanges 80.

Figure 5A:
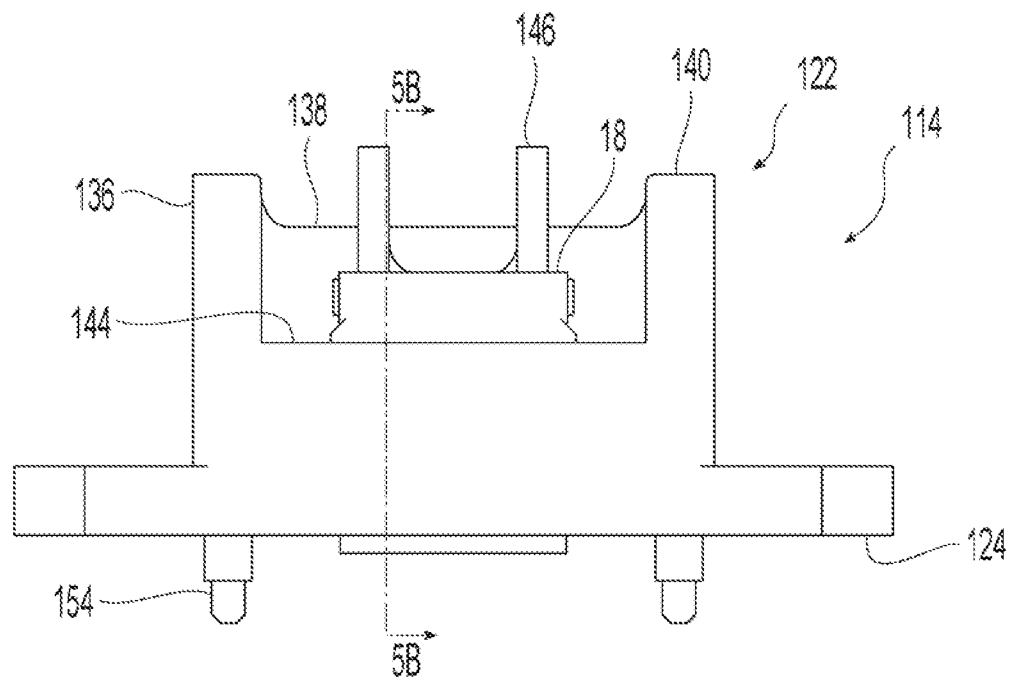
FIG. 5A is a front view of an alternative embodiment of a portion of an adapter according to the present invention.
Figure 5B:
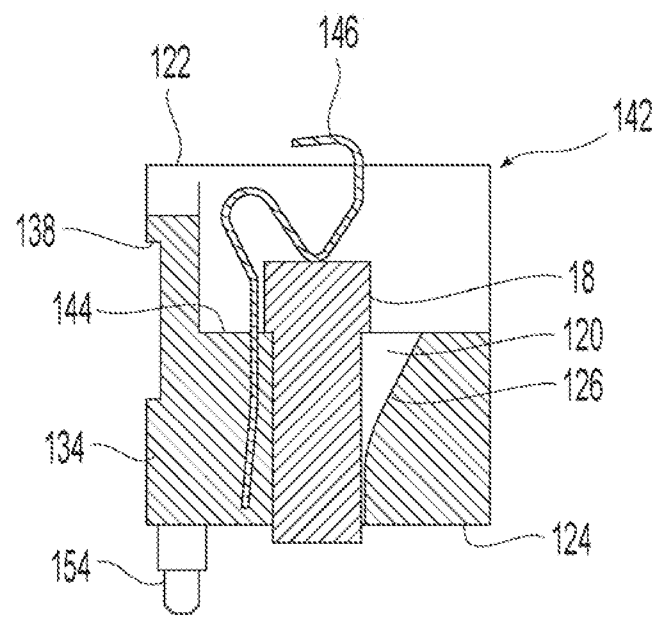
FIG. 5B is a cross section view of the portion of the adapter in FIG. 5A.

An alternative embodiment according to the present invention is illustrated in FIGS. 5A and 5B. In this embodiment only the first body half 114 is illustrated and it is to be understood that the second body half would be the same as described above. First body half 114 is configured to receive the multi-fiber ferrule 18 in an opening 120 that extends between a free end 122 and the mating end 124. The opening 120 would be aligned with the other opening in the second body half so that the end face of the multi-fiber ferrule 18 and the end face of ferrule in the fiber optic connector 28 will be in mechanical and optical alignment with each other. Again, first body half 114 may be made as a single, unitary piece with the second body half.

The first body half 114 has a base 134 at the mating end 124 and three walls 136,138,140 extending away from the mating end 124 and towards the free end 122 to provide protection to the multi-fiber ferrule 18 when inserted into the opening 120. The first body half 114 also has an open side 142 that allows easy access to the multi-fiber ferrule 18 and opening 120. The opening 120 has a chamfered portion 126 to allow the ferrule 18 to be inserted as described in more detail below. The first body half 114 also has central portion 144 in which the opening 120 is formed. The central portion 144 is preferably attached to all three walls 136,138,140 because engagement member 146 is embedded into the first body half 114. As best seen in FIG. 5B, the engagement member 146 is preferably a fixed spring latch that includes two elastic members that extend upward and out of the central portion 144 between the opening 120 and the wall 138 and forcibly pushes downward on the rear face of the multi-fiber ferrule 18 (preferably with a force of about 2 lbs.) to keep multi-fiber ferrule 18 in the first body half 114. The engagement member 146 is flexed toward wall 138 to allow access to the opening 120 and multi-fiber ferrule 18 is inserted into opening 120. The engagement member 146 may prevent the upright insertion of the multi-fiber ferrule 18, so the chamfered portion 126 may be needed to allow the insertion of the multi-fiber ferrule 18 at an angle to prevent damage to the multi-fiber ferrule 18 or first body half 114. The engagement member 146 is also flexible enough to allow for the use of a pin clamp plate with the multi-fiber ferrule 18 if the multi-fiber ferrule 18 is required to have guide pins as discussed above. The first body half 114 may also have two projections 154 and two recesses (not shown) as discussed above.

Figure 6A:
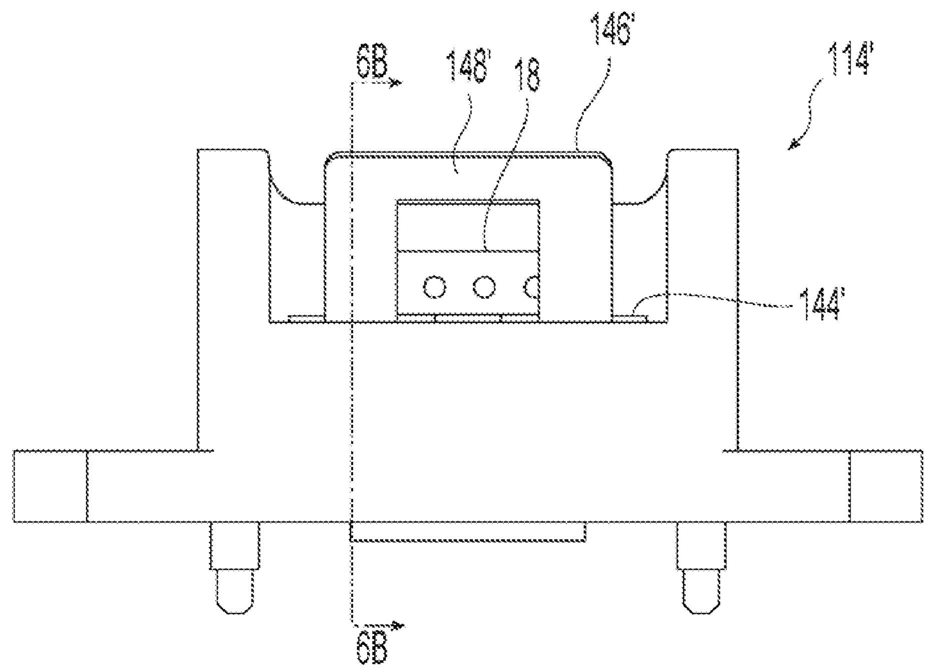
FIG. 6A is a front view of an alternative embodiment of a portion of an adapter according to the present invention.
Figure 6B:
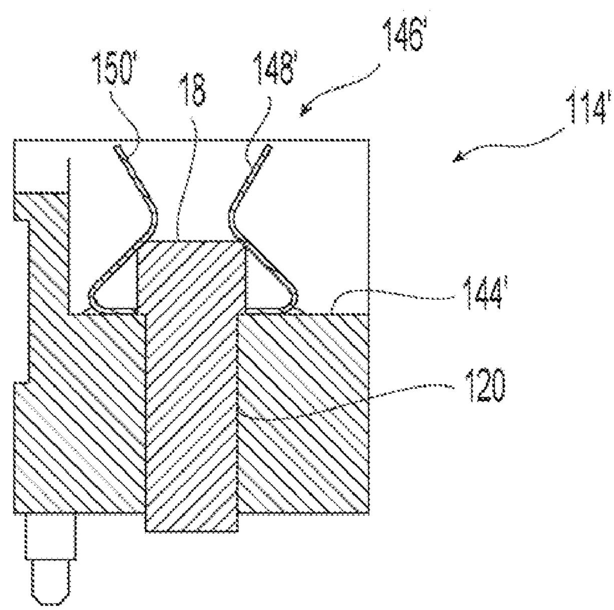
FIG. 6B is a cross section view of the portion of the adapter in FIG. 6A.

Another embodiment of the present invention is illustrated in FIGS. 6A and 6B. The first body half 114' is similar to the one in FIGS. 5A and 5B, with a different engagement member 146'. Engagement member 146' is preferably a one piece (although it could be any number of pieces) fixed spring latch that is disposed on at least two sides of opening 120 and is at least partially embedded into the central portion 144' of the first body half 114'. Engagement member 146' has a first spring portion 148' on a first side of opening 120 that extends upward from the central portion 144' and towards opening 120 and then continues to extend upward but away from opening 120. Engagement member 146' has a second spring portion 150' on an opposite side of opening 120 that extends upward from the central portion 144' and towards opening 120 and first spring portion 148' and then continues to extend upward but away from opening 120. As illustrated best in FIG. 6B, the spring two portions 148' and 150' of the engagement member 146' provide a funnel-like opening therein to receive the multi-fiber ferrule 18 and, because of the elastic characteristics of the spring portions 148',150' of engagement member 146', will move away from one another to allow the multi-fiber ferrule 18 to be inserted into opening 120. Once the multi-fiber ferrule 18 is inserted completely into opening 120, the two spring portions 148' and 150' of the engagement member 146' will return to engage a rear portion of the multi-fiber ferrule 18 to keep multi-fiber ferrule 18 in the first body half 114'. While the engagement member 146' is illustrated along the two long sides of the opening 120, it could be oriented such that it is oriented along the short sides and still fall within the scope of the present invention.

Figure 7A:
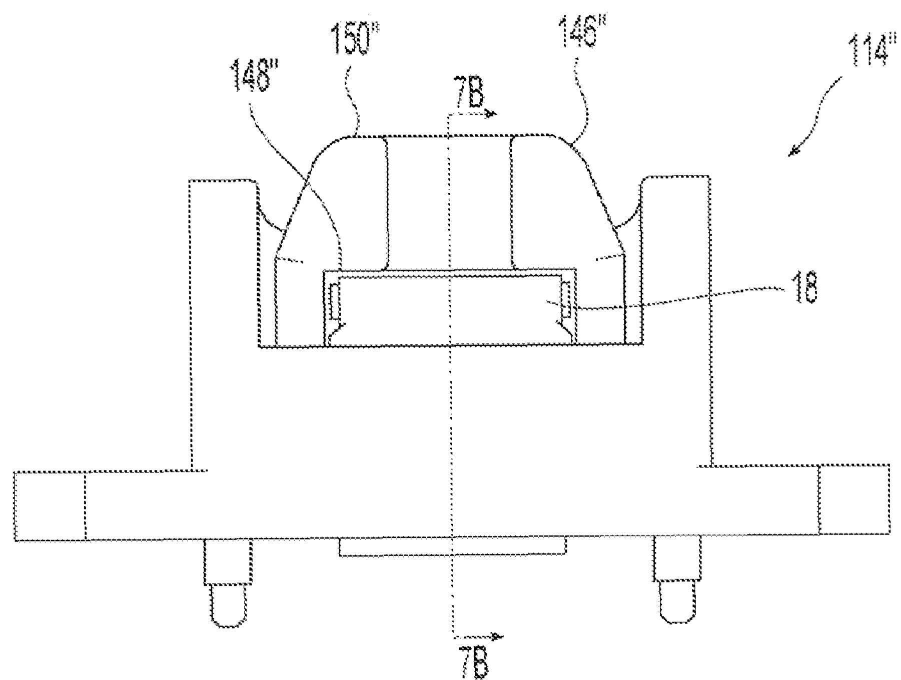
FIG. 7A is a front view of an alternative embodiment of a portion of an adapter according to the present invention.
Figure 7B:
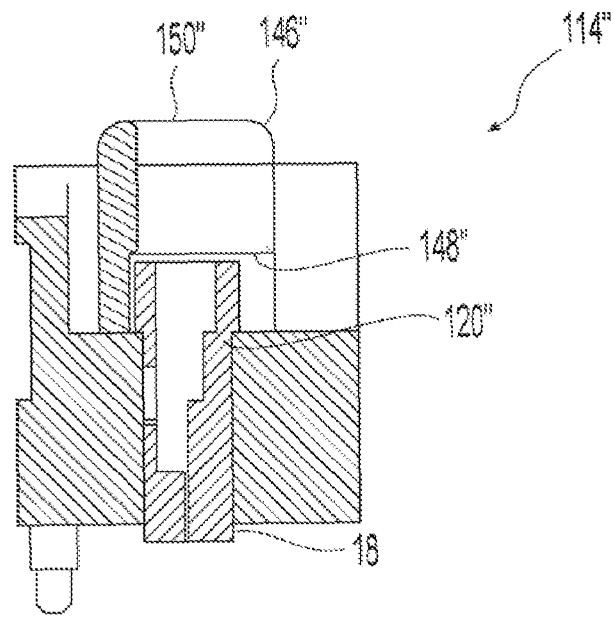
FIG. 7B is a cross section view of the portion of the adapter in FIG. 7A.

Another embodiment according to the present invention is illustrated in FIGS. 7A and 7B. In this embodiment, the first body half 114" has an engagement member 146" that is a fixed, nonflexible member. The engagement member 146" is preferably made from a plastic material with prongs that engage openings in central portion 144" and engages the rear face of the multi-fiber ferrule 18 along at least two sides and more preferably along three sides. The engagement member 146" engages the rear face of multi-fiber ferrule 18 with shoulders 148" and has an opening 150" that allows the optical fibers (not shown) to exit the rear of the multi-fiber ferrule 18. Engagement member 146" rigidly holds multi-fiber ferrule 18 in the opening 120" and does not allow the multi-fiber ferrule 18 to float relative to the first body half 114" as in the prior embodiments. Therefore, it is imperative that the connector or ferrule that mates with the multi-fiber ferrule 18 in this embodiment have a spring in order to mate with each other correctly.

Figure 8:
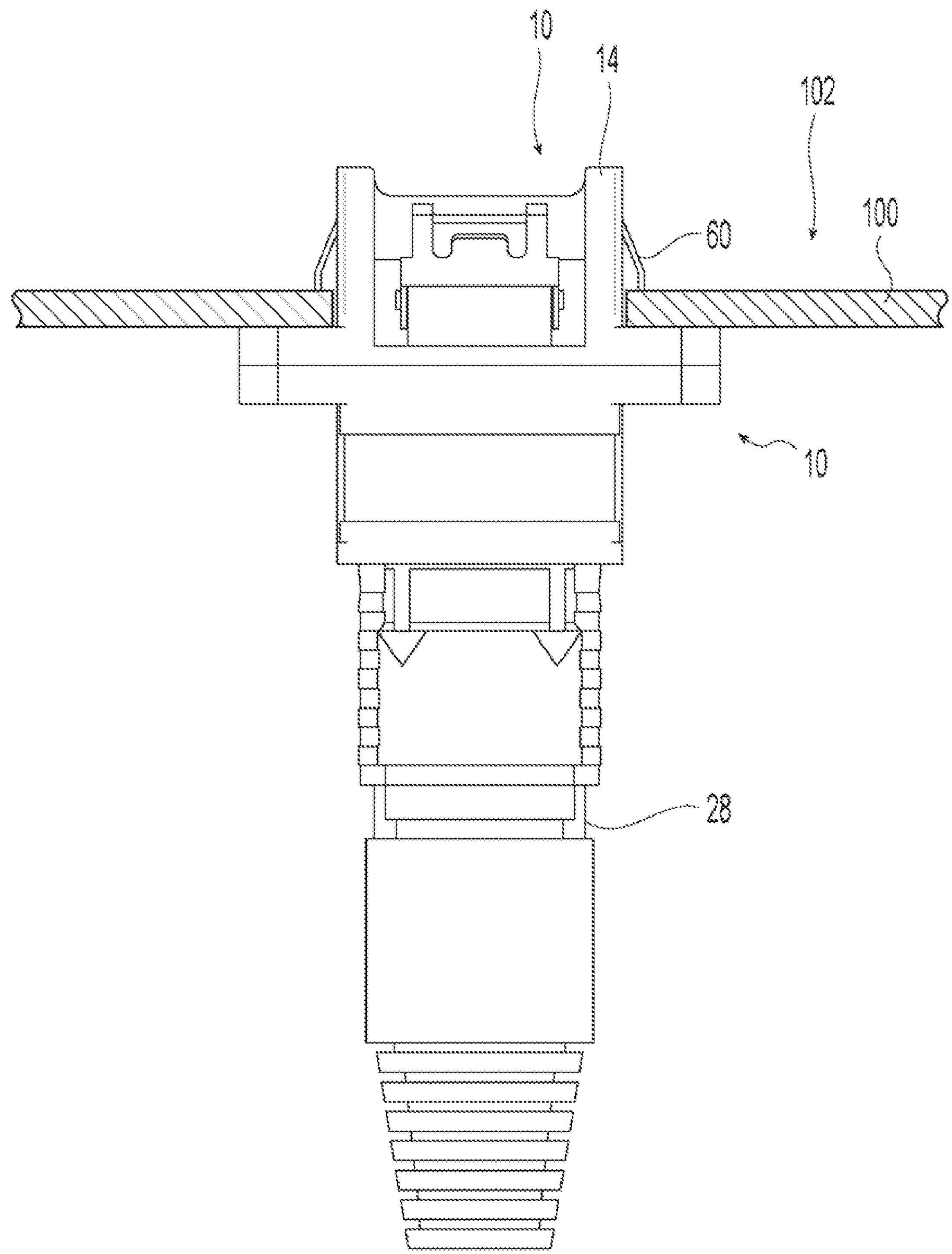
FIG. 8 is a top view of the adapter of FIG. 1 with a fiber optic connector and multi-fiber ferrule in the adapter installed in a fiber optic panel or box.

FIG. 8 illustrates adapter 10 having a connector 28 installed on the second side and a multi-fiber ferrule 18 installed on the first side. The adapter 10 is installed into a fiber-optic panel or box 100. As is known in the art, the spring clip 60 engages the inside or rear portion 102 of the fiber-optic panel or box 100, preventing it from being pulled out of the fiber-optic panel or box 100. Since the first body half 14 of adapter 10 is behind the fiber-optic panel or box 100 and not readily accessible to the user or tradesman, there is no need for the protective components of the connector 28 and only a ferrule is need to optically and mechanically connect the multi-fiber ferrule 18 to the connector 28.

Similar engagement members for a different adapter are disclosed in a co-pending application Ser. No. 11/673,191, entitled "Ferrule-to-Ferrule Adapter And Ferrule Adapter Assembly", filed on the same date, the contents of which are expressly incorporated in their entirety by reference herein.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An adapter for holding a multi-fiber ferrule in position to mate with a fiber optic connector comprising:

an adapter body, the adapter body having a first side and a second side;

a first opening disposed in the first side of the adapter body and configured to receive the multi-fiber ferrule;

a second opening being disposed in the second side of the adapter body and in communication with the first opening, the second opening configured to removably receive the fiber optic connector and the first and second openings configured to position the fiber optic connector and multi-fiber ferrule to optically and mechanically engage one another; and an engagement member connected to the adapter and disposed adjacent the first opening to engage and hold the multi-fiber ferrule in the adapter.

2. The adapter according to claim 1, wherein the engagement member rotates between a first position and a second position and about an axis transverse to the openings, the engagement member engaging the multi-fiber ferrule in the first position.

3. The adapter according to claim 1, wherein the adapter body only engages a front portion of the multi-fiber ferrule disposed therein.

4. The adapter according to claim 1, further comprising a flange disposed between the first and second sides, the flange configured to engage a fiber optic panel when the first side of the adapter is inserted through a hole in the fiber optic panel.

5. The adapter according to claim 4, further comprising at least one screw-sized hole disposed in the flange to correspond to at least one screw-sized hole in the fiber optic panel.

6. The adapter according to claim 1, further comprising a spring clip disposed on an outside surface of the adapter body to engage a fiber optic panel, thereby retaining the adapter in the fiber optic panel.

7. The adapter according to claim 1, wherein the engagement member is a fixed spring latch.

8. The adapter according to claim 7, wherein the fixed spring latch is at least partially embedded in the main body.

9. The adapter according to claim 7, wherein the fixed spring latch is disposed on two sides of the opening on the first side of the main body.

10. The adapter according to claim 1, wherein the engagement member is configured to accommodate a pin clamp plate associated with the multi-fiber ferrule.

11. The adapter according to claim 1, wherein the adapter body has a two body halves, a first body half corresponding to the first side of the adapter body and a second body half corresponding to the second side of the adapter body.

12. An adapter for removably receiving one optical fiber connector and a multi-fiber ferrule in an operative coupled relationship, the adapter comprising:

a first body half having a free end to removably receive the optical fiber connector and a mating end opposite thereto and defining an opening therethrough from the free end to the mating end;

a second body half having a free end to receive the multi-fiber ferrule and a mating end opposite thereto, the first body half having an opening therethrough from the free end to the mating end and joined to the second body half at the mating ends so as to align the openings along a common longitudinal axis; and an engagement member connected to the second body half, the engagement member disposed adjacent the free end and the opening therein to engage and hold the multi-fiber ferrule in the adapter.

13. The adapter according to claim 12, wherein the engagement member rotates between a first position and a second position and about an axis transverse to the openings, the engagement member engaging the multi-fiber ferrule in the first position.

14. The adapter according to claim 12, wherein the adapter body only engages a front portion of the multi-fiber ferrule disposed therein.

15. The adapter according to claim 12, further comprising a flange disposed between the first and second sides, the flange configured to engage a fiber optic panel when the first side of the adapter is inserted through a hole in the fiber optic panel.

16. The adapter according to claim 15, further comprising at least one screw-sized hole disposed in the flange to correspond to at least one screw-sized hole in the fiber optic panel.

17. The adapter according to claim 12, further comprising a spring clip disposed on an outside surface of the adapter body to engage a fiber optic panel, thereby retaining the adapter in the fiber optic panel.

18. The adapter according to claim 12, wherein the engagement member is a fixed spring latch.

19. The adapter according to claim 12, wherein the engagement member is configured to accommodate a pin clamp plate associated with the multi-fiber ferrule.

20. An adapter and fiber optic assembly, comprising:

an optical fiber connector, the optical fiber connector having a ferrule that contains at least one optical fiber that terminates at an end face of the ferrule;

a multi-fiber ferrule, the multi-fiber ferrule having at least one optical fiber that terminates at an end face of the multi-fiber ferrule;

an adapter body, the adapter body having a first side and a second side;

a first opening disposed in the first side of the adapter body and configured to receive the multi-fiber ferrule;

a second opening being disposed in the second side of the adapter body and in communication with the first opening, the second opening configured to removably receive the fiber optic connector and the first and second openings configured to position the fiber optic connector and multi-fiber ferrule to optically and mechanically engage one another; and an engagement member connected to the adapter and disposed adjacent the first opening to engage and hold the multi-fiber ferrule in the adapter.

* * * * *